United States Patent
Musolf et al.

(10) Patent No.: US 7,195,521 B2
(45) Date of Patent: Mar. 27, 2007

(54) FRONT ACCESS DSX ASSEMBLY

(75) Inventors: Bruce R. Musolf, Eagan, MN (US); Richard T. Demulling, Maplewood, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/033,991

(22) Filed: Jan. 11, 2005

(65) Prior Publication Data

US 2005/0227544 A1    Oct. 13, 2005

Related U.S. Application Data

(63) Continuation of application No. 09/967,316, filed on Sep. 28, 2001, now Pat. No. 6,840,815.

(51) Int. Cl.
    *H01R 24/04* (2006.01)
(52) U.S. Cl. ...................................... 439/668
(58) Field of Classification Search ........ 439/668–669, 439/188; 379/399
    See application file for complete search history.

(56) References Cited

U.S. PATENT DOCUMENTS

| | | | |
|---|---|---|---|
| 4,840,568 A | 6/1989 | Burroughs et al. | |
| 4,945,559 A | 7/1990 | Collins et al. | |
| 4,949,376 A | 8/1990 | Nieves et al. | |
| 5,359,654 A | 10/1994 | Jensen et al. | |
| 5,363,440 A | 11/1994 | Daoud | |
| 5,685,741 A | 11/1997 | Dewey et al. | |
| 5,708,751 A * | 1/1998 | Mattei | 385/135 |
| 5,938,478 A | 8/1999 | Werner | |
| 6,038,766 A | 3/2000 | Werner | |
| 6,116,961 A | 9/2000 | Henneberger et al. | |
| 6,356,697 B1 | 3/2002 | Braga et al. | |
| 6,621,975 B2 | 9/2003 | Laporte et al. | |
| 6,840,815 B2 | 1/2005 | Musolf et al. | |

FOREIGN PATENT DOCUMENTS

| | | |
|---|---|---|
| EP | 0 795 935 A2 | 9/1997 |
| EP | 1 021 050 A1 | 7/2000 |
| WO | WO96/38884 | 12/1996 |

OTHER PUBLICATIONS

"E1 64 Circuit Panel. Telect Part No. E64-5000-1100", http://www.telect.com/index.cfm?object=1499&op=1,992,701,1430,1495,1498,1499, Telect, 3 pages (Jun. 13, 2001).

(Continued)

*Primary Examiner*—Jean Frantz Duverne
(74) *Attorney, Agent, or Firm*—Merchant & Gould P.C.

(57) ABSTRACT

A DSX jack module having removable jacks is disclosed. The jack module includes a jack mount for holding the jacks. The jack module also includes a front facing cross-connect array and a front facing IN/OUT array. A circuit board is electrically connected to the arrays. The circuit board includes portions positioned directly behind the cross-connect array and the IN/OUT array. A chassis for holding jack modules is also disclosed. The chassis includes a front door having a double hinge configuration.

25 Claims, 16 Drawing Sheets

OTHER PUBLICATIONS

"E1 64 Circuit Panel. Telect Part No. E64-5000-1200", http://www.telect.com/index.cfm?object=1500&op=1,992,701,1430,1495,1498,1500, Telect, 3 pages (Jun. 13, 2001).

"RJ45 Chassis Assembly Installation Drawing", ADC, Catalog No. DFX-120001, 2 pages (Sep. 28, 2000).

"Assembly, Chassis Wire Wrap, Flex-X", ADC, Catalog No. DFX-1FA064, 4 pages (May 18, 2000).

"64-CKT DSI/Flex Module All Front Access with I/O Monitor", ADC, Catalog No. DFX-1FA064, 2 pages (Mar. 27, 2000).

* cited by examiner

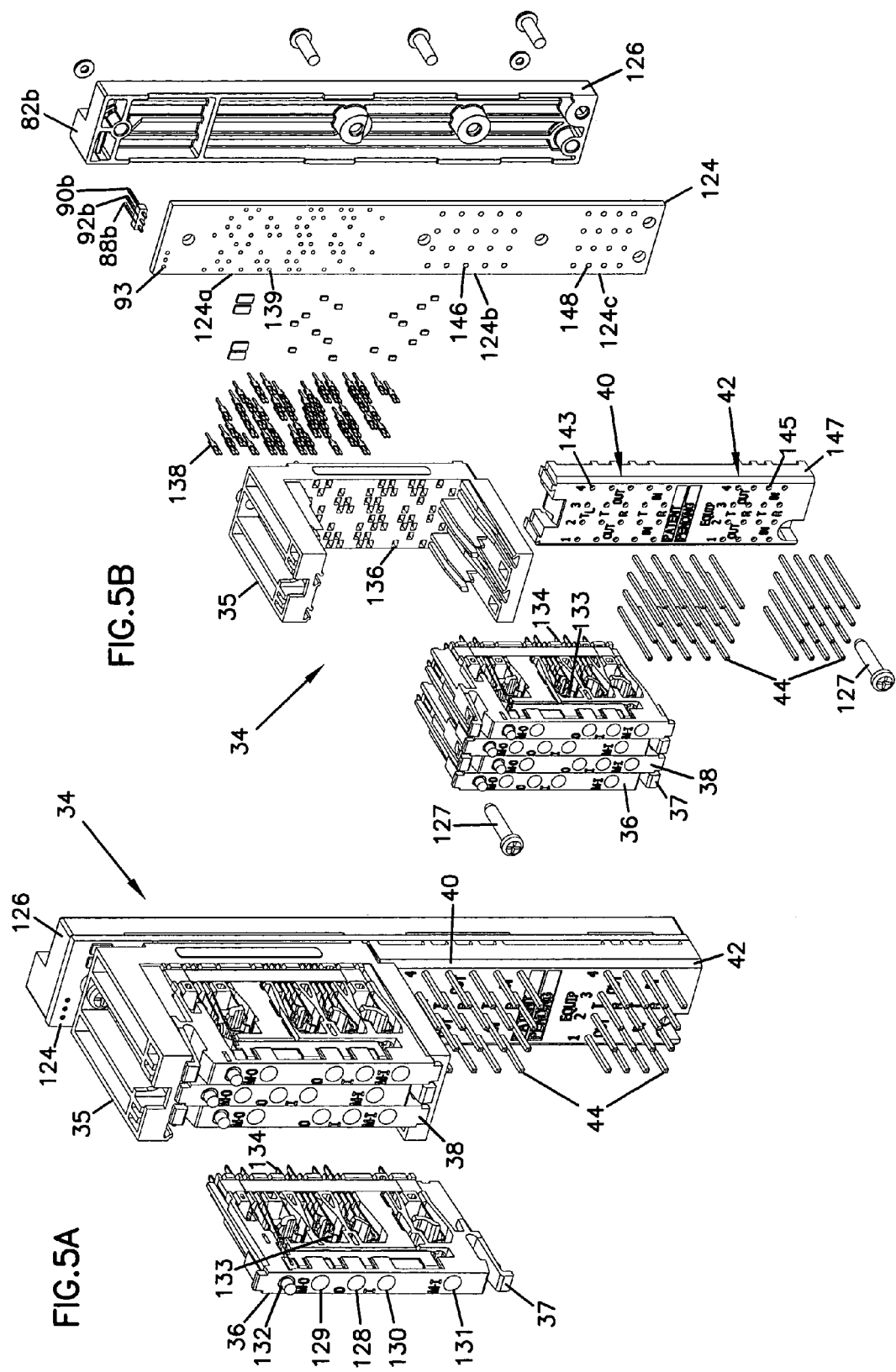

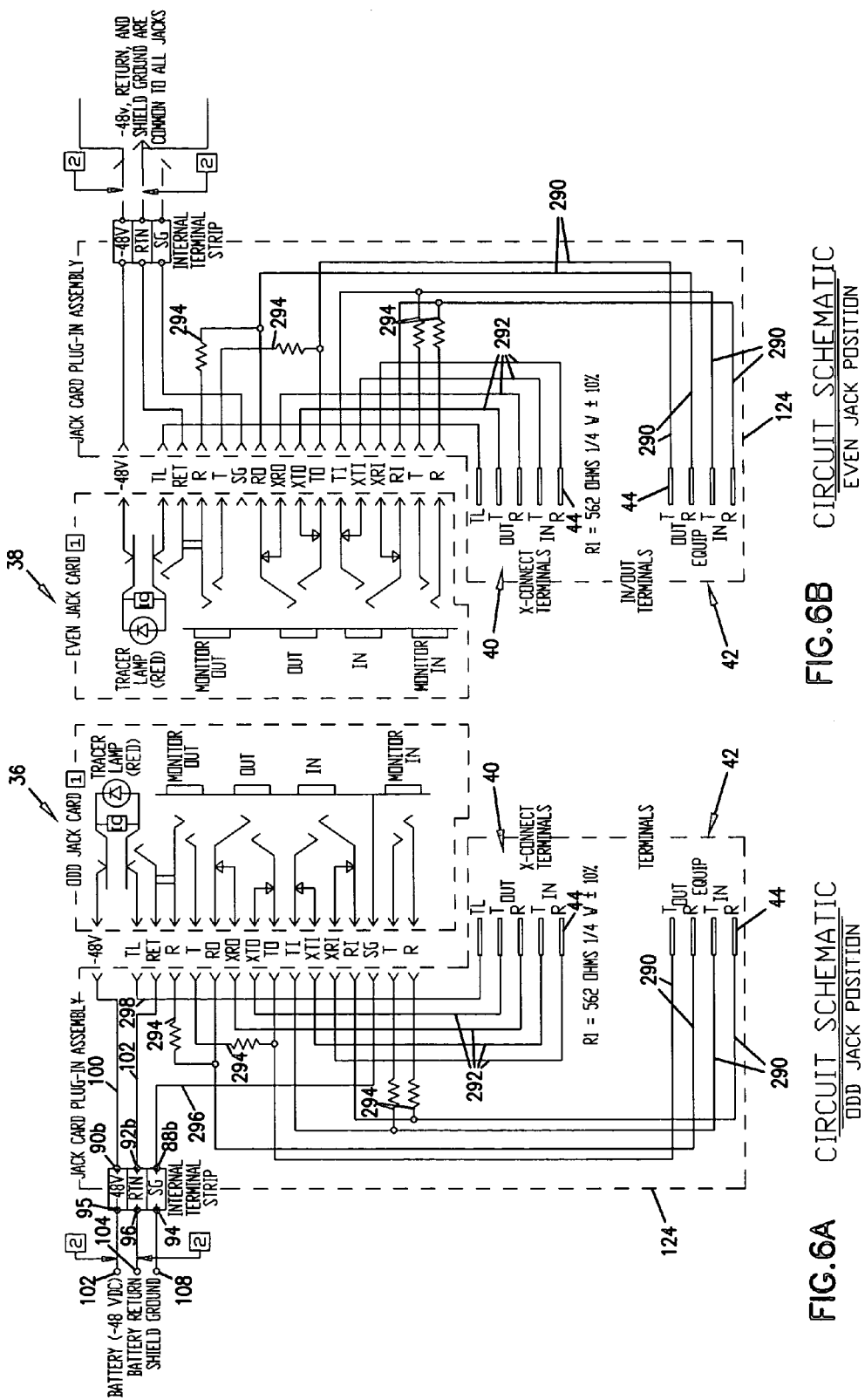

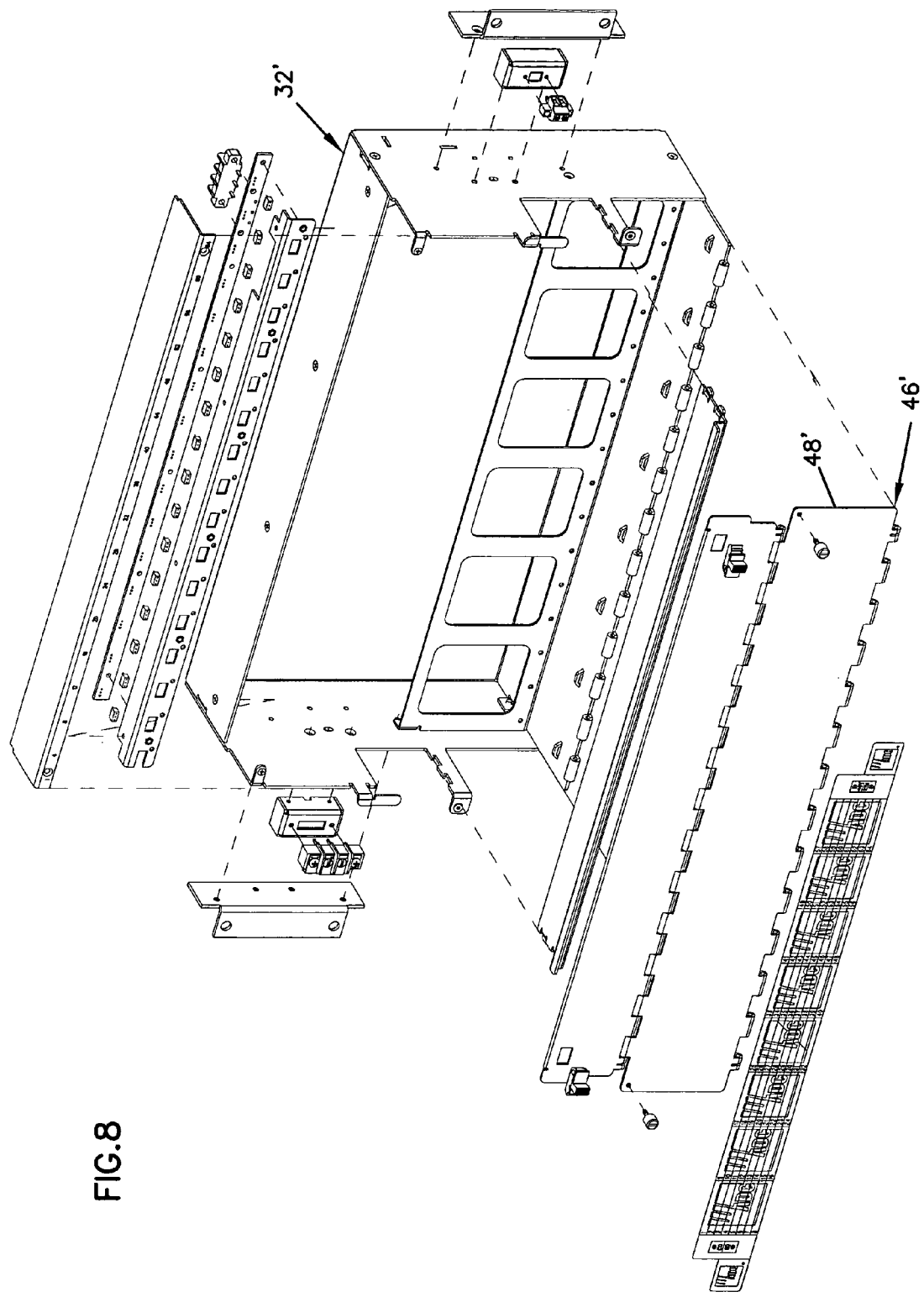

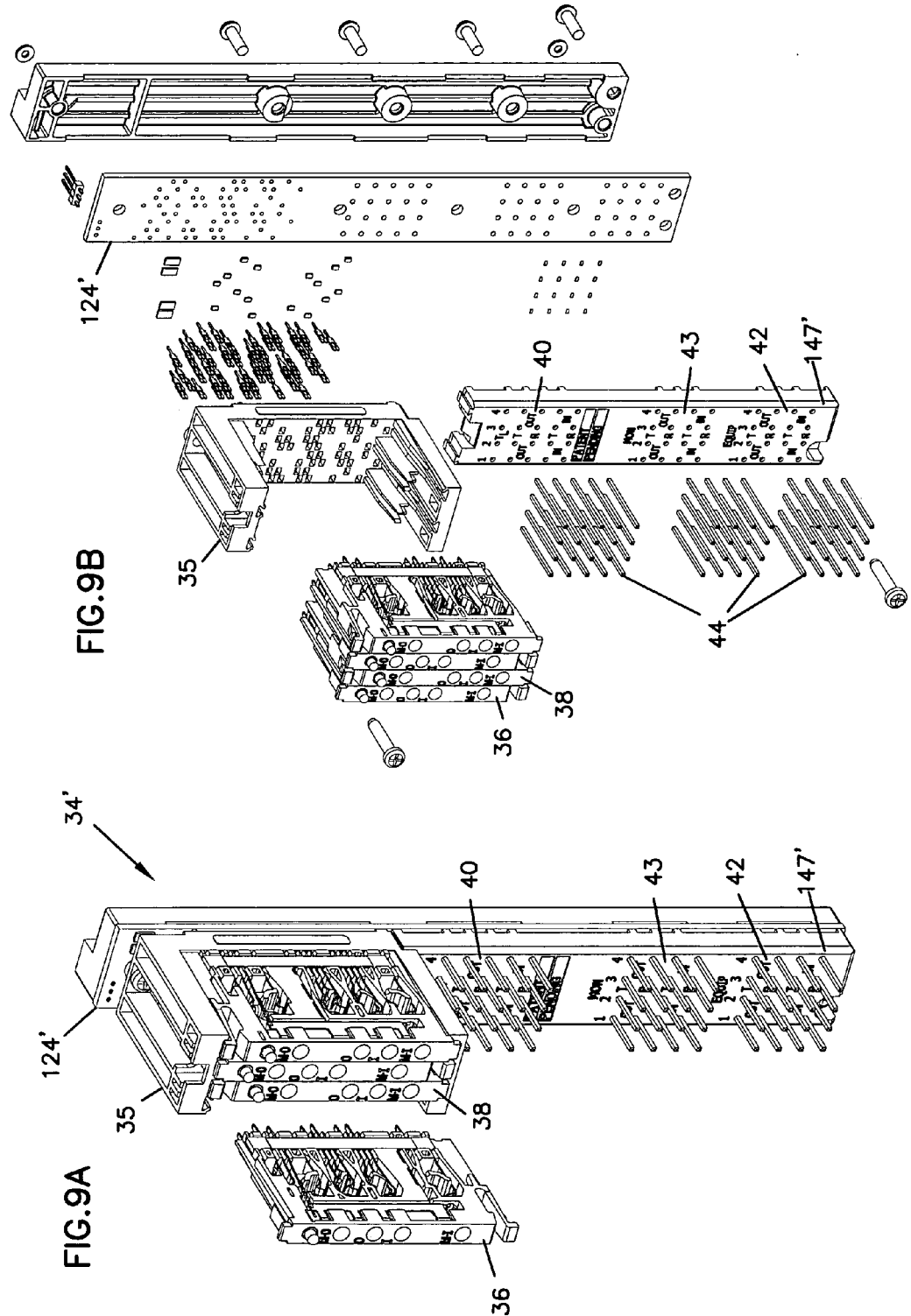

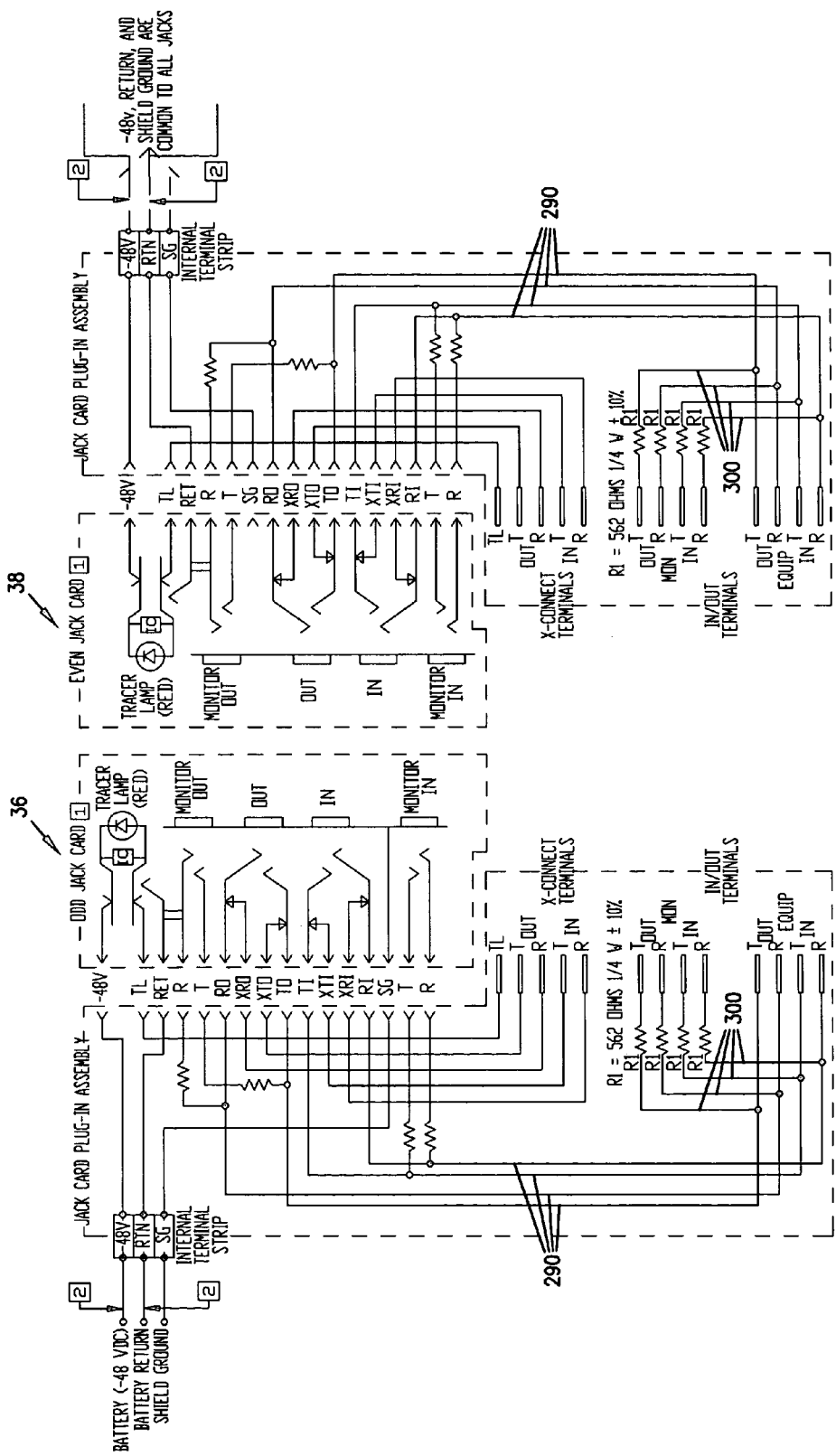

FRONT ACCESS DSX ASSEMBLY

CROSS-REFERENCE TO RELATED APPLICATIONS

This application is a continuation of U.S. application Ser. No. 09/967,316 filed on Sep. 28, 2001, now U.S. Pat. No. 6,840,815 which application is incorporated herein by reference.

FIELD OF THE INVENTION

The present invention relates generally to telecommunications equipment. More particularly, the present invention relates to digital cross-connect equipment.

BACKGROUND OF THE INVENTION

A digital cross-connect system (DSX) provides a location for interconnecting two digital transmission paths. The apparatus for a DSX is located in one or more frames, or bays, usually in a telephone service provider's central office. The DSX apparatus also provides jack access to the transmission paths.

DSX jacks are well known and typically include a plurality of bores sized for receiving plugs. A plurality of switches are provided within the bores for contacting the plugs. The jacks are electrically connected to digital transmission lines, and are also electrically connected to a plurality of termination members used to cross-connect the jacks. By inserting plugs within the bores of the jacks, signals transmitted through the jacks can be interrupted or monitored.

FIG. 1 schematically illustrates a DSX system that is an example of the type found at a telephone service provider's central office. The DSX system is shown including three DSX jacks 10a, 10b and 10c. Each DSX jack 10a, 10b and 10c is connected to a specific piece of digital equipment. For example, jack 10a is shown connected to digital switch 12, jack 10b is shown connected to office repeater 14a, and jack 10c is shown connected to office repeater 14b. Each piece of digital equipment has a point at which a digital signal can enter, as well as a point at which the digital signal can exit. The jacks 10a, 10b and 10c each include OUT termination pins 16 and IN termination pins 18. The DSX jacks 10a, 10b and 10c are connected to their corresponding pieces of digital equipment by connecting the OUT termination pins 16 to the signals exiting the equipment (i.e., going toward the DSX system) and the IN termination pins 18 to the signals entering the equipment (i.e., going away from the DSX system).

Referring still to FIG. 1, jacks 10a and 10b are "cross-connected" to one another by semi-permanent connections. The semi-permanent connections extend between cross-connect fields 19 of the jacks 10a and 10b. For example, patch cords 20 connect OUT cross-connect pins of jack 10a to IN cross-connect pins of jack 10b. Similarly, patch cords 21 connect IN cross-connect pins of jack 10a to OUT cross-connect pins of jack 10b. The jacks 10a and 10b are preferably normally closed. Thus, in the absence of a plug inserted within either of the jacks 10a and 10b, an interconnection is provided between the jacks 10a and 10b and therefore between digital switch 12 and office repeater 14a.

The semi-permanent connection between the digital switch 12 and the office repeater 14a can be interrupted for diagnostic purposes by inserting plugs within the IN or OUT ports of the jacks 10a and 10b. Likewise, patch cords can be used to interrupt the semi-permanent connection between the jacks 10a and 10b to provide connections with other pieces of digital equipment. For example, the digital switch 12 can be disconnected from the office repeater 14a and connected to the office repeater 14b through the use of patch cords 23. The patch cords 23 include plugs that are inserted within the IN and OUT ports of the jack 10a and the IN and OUT ports of the jack 10c. By inserting the plugs within the IN and OUT ports of the jack 10a, the normally closed contacts are opened, thereby breaking the electrical connection with the office repeater 14a and initiating an electrical connection with office repeater 14b.

SUMMARY OF THE INVENTION

One embodiment of the present invention relates to a DSX system having a cross-connect field and an IN/OUT field that are accessible from the front of the system.

Another embodiment of the present invention relates to a DSX system having a cross-connect field, an IN/OUT field and a monitor field that are accessible from the front of the system.

Another embodiment of the present invention includes a telecommunications chassis having a double-hinged door for covering selected portions of the chassis.

A variety of aspects of the invention are set forth in part in the description that follows, and in part will be apparent from the description, or may be learned by practicing the invention. The aspects of the invention relate to individual features as well as combinations of features. It is to be understood that both the foregoing general description and the following detailed description are exemplary and explanatory only, and are not restrictive of the invention as claimed.

BRIEF DESCRIPTION OF THE DRAWINGS

FIG. 5A is a front perspective view of one of the DSX jack modules of the DSX system of FIG. 2A;

FIG. 5B is an exploded view of the DSX jack module of FIG. 5A;

FIGS. 6A and 6B are circuit schematics of odd and even DSX jacks of the DSX jack module of FIG. 5A;

FIG. 8 is an exploded view of the chassis of the DSX system of FIG. 7A;

FIG. 9A is a front perspective view of one of the DSX jack modules of the DSX system of FIG. 7A;

FIG. 9B is an exploded view of the DSX jack module of FIG. 9A;

FIGS. 10A and 10B are circuit schematics of odd and even DSX jacks of the DSX jack module of FIG. 9A.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
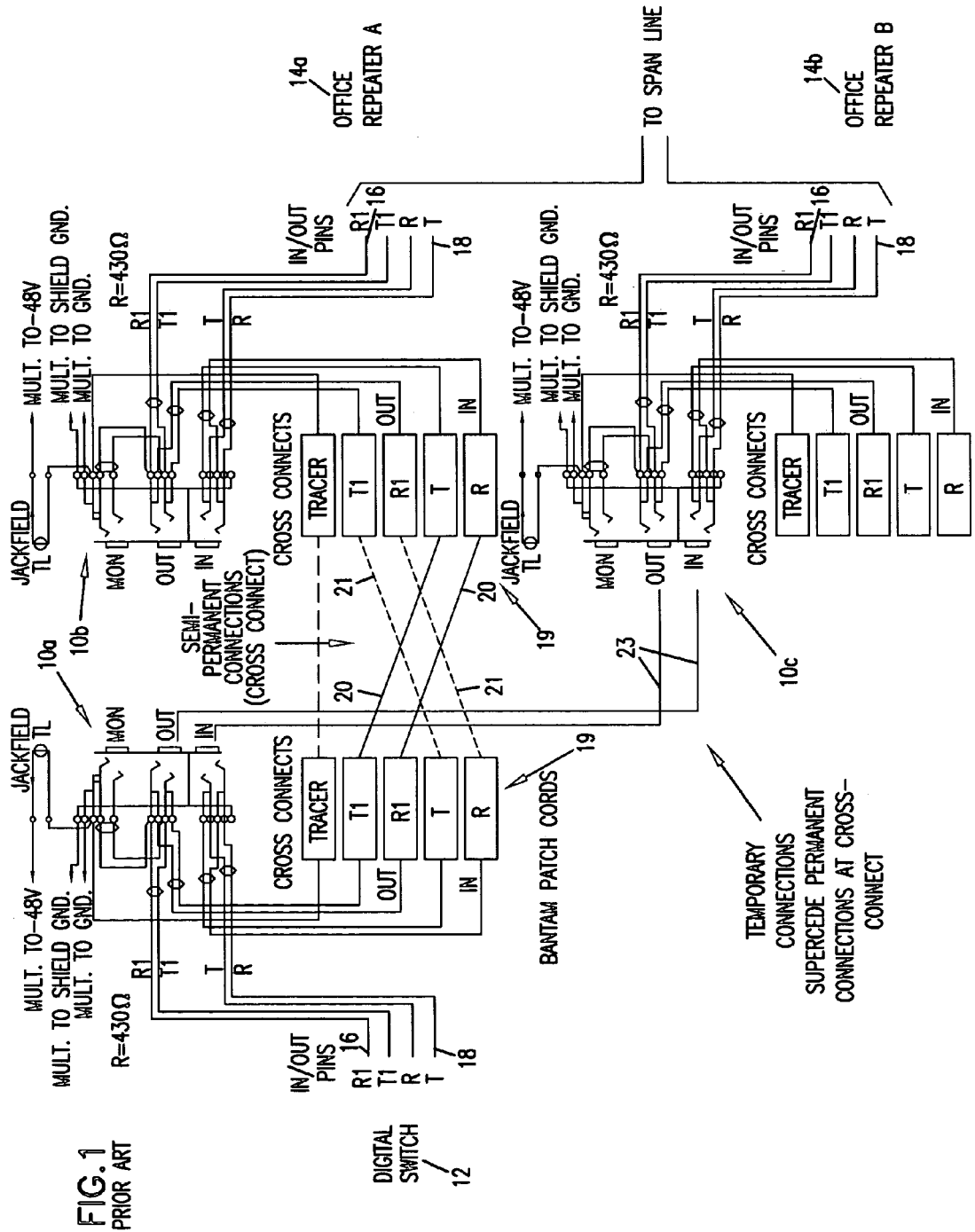
FIG. 1 is a schematic diagram of a prior art DSX system.
Figure 2A:
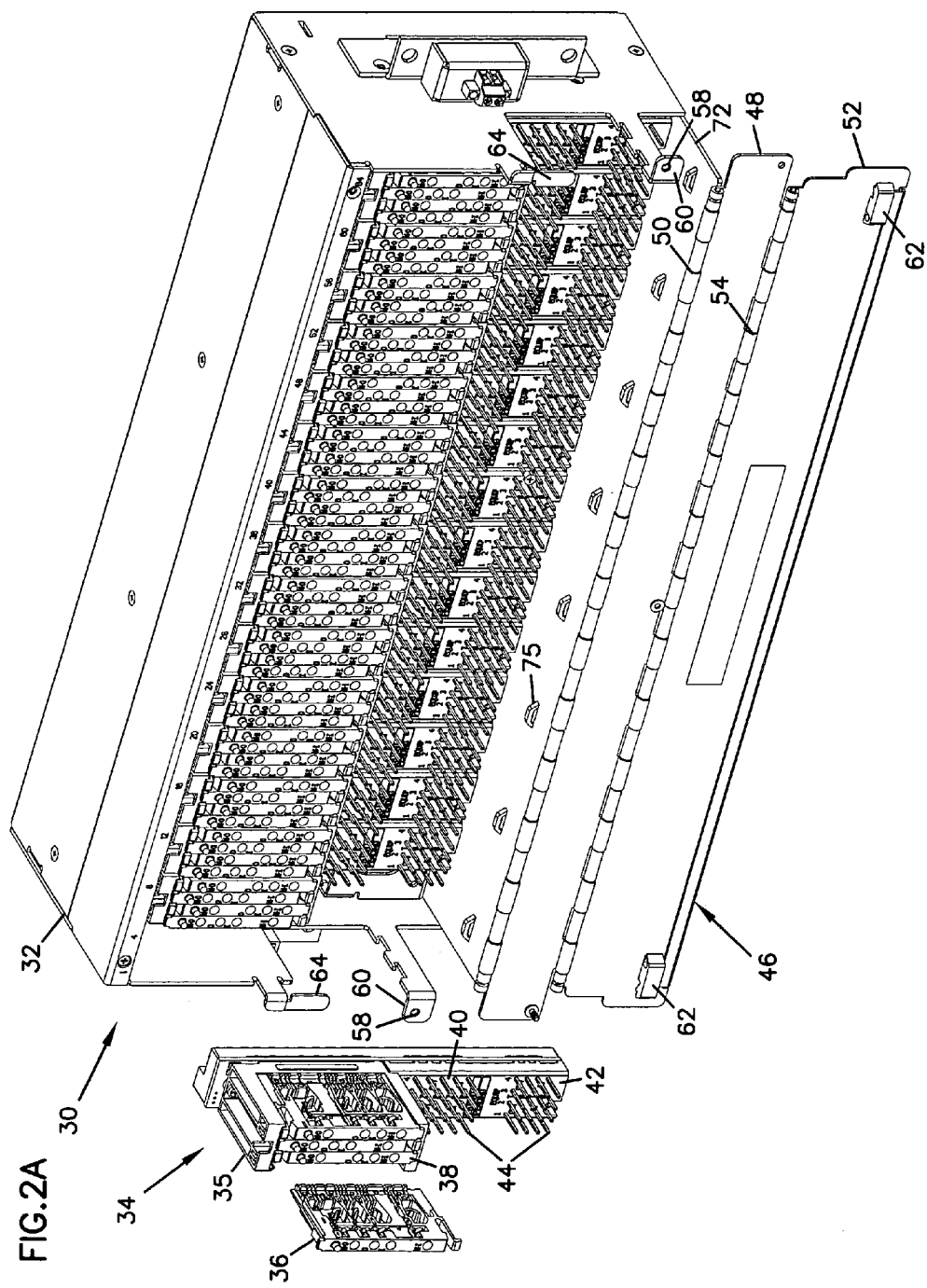
FIG. 2A is a front perspective view of a DSX system that is an embodiment of the present invention, the system includes a chassis having a bi-fold front door that is shown in an open position.
Figure 2B:
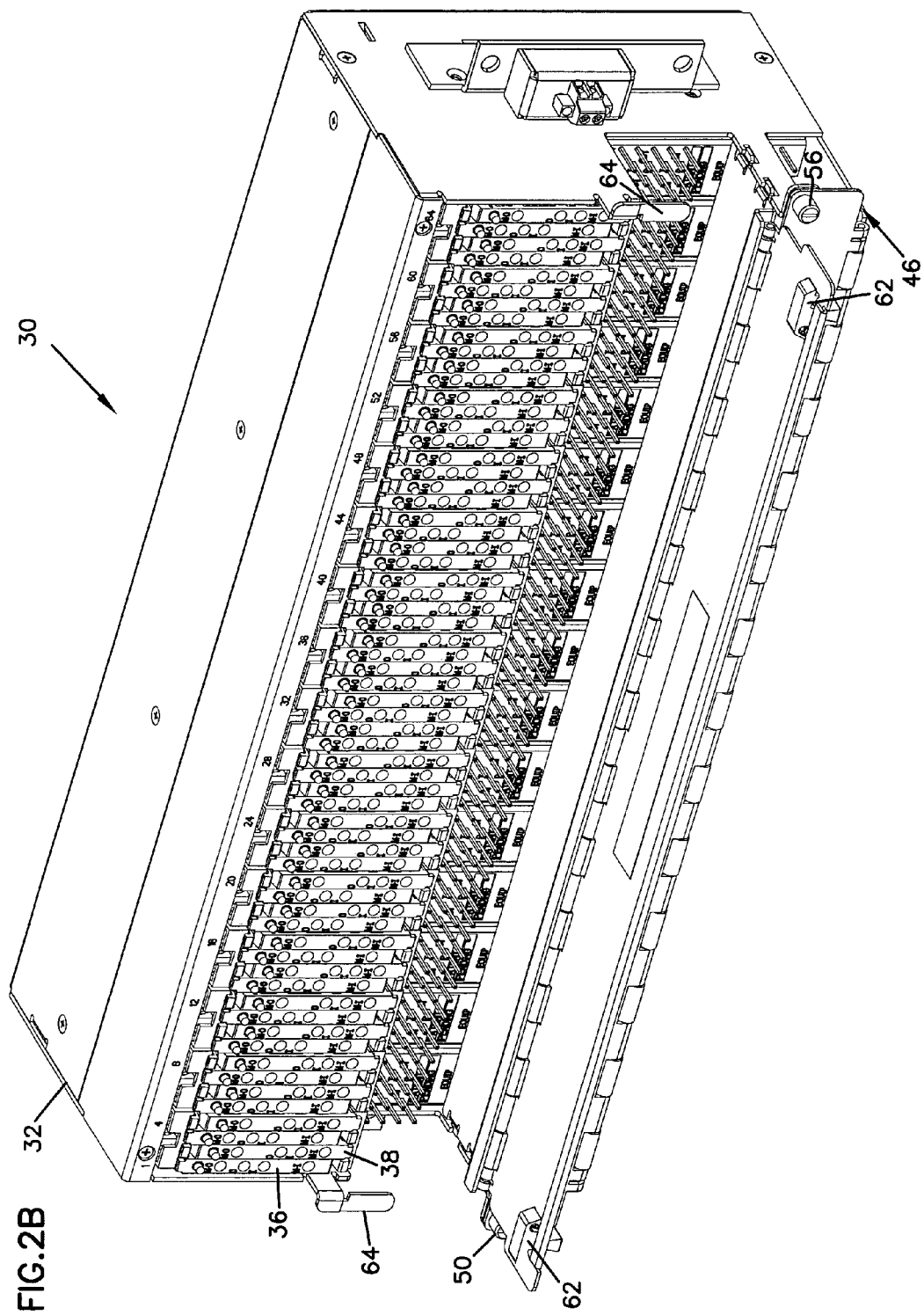
FIG. 2B shows the DSX system of FIG. 2A with one panel of the front door in a closed position.
Figure 2C:
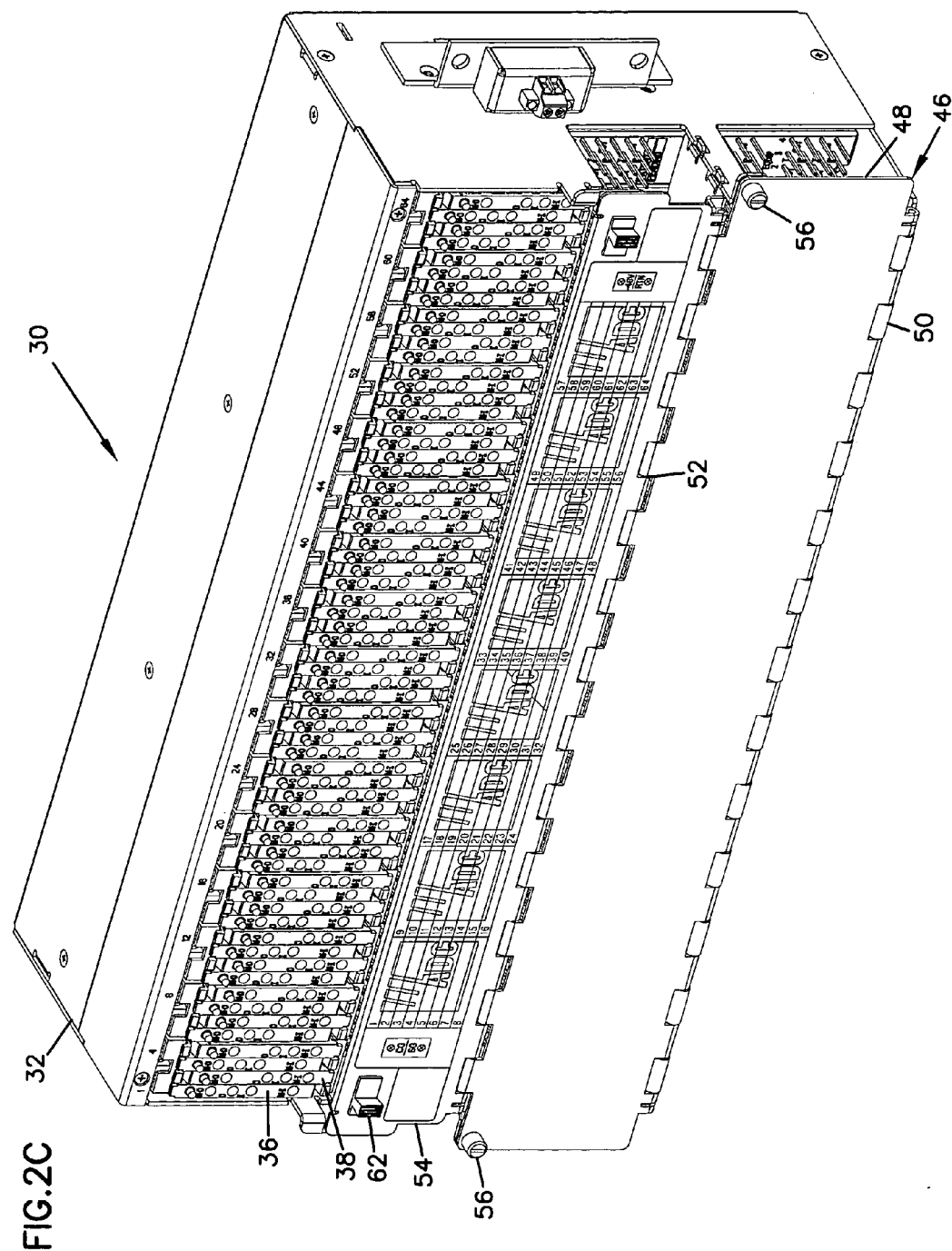
FIG. 2C shows the DSX system of FIG. 2A with both panels of the front door in closed positions.

FIGS. 2A–2C illustrate a DSX system 30 that is an embodiment of the present invention. The DSX system 30 includes a chassis 32 for holding a plurality (e.g., 16) of removable jack modules 34. Each of the jack modules 34 includes a jack mount 35 configured to hold a plurality of jacks (e.g., two odd jacks 36 and two even jacks 38). The jack modules 34 also each include a forwardly facing cross-connect block 40 and a forwardly facing IN/OUT block 42. The blocks 40, 42 can also be referred to as panels, arrays or fields. The blocks 40, 42 include a plurality of termination structures such as wire wrap pins 44 or other types of connectors/contacts for terminating a wire (e.g., insulation displacement connectors; co-axial connectors such as BNC connectors, 1.6/5.6 connectors or SMB connectors; or RJ series connectors such as RJ45 connectors, RJ48 connectors or RJ21 connectors). The chassis 32 of the DSX system 30 includes a front door 46 for covering the cross-connect blocks 40 and the IN/OUT blocks 42.

I. Chassis of First Embodiment

Figure 3:
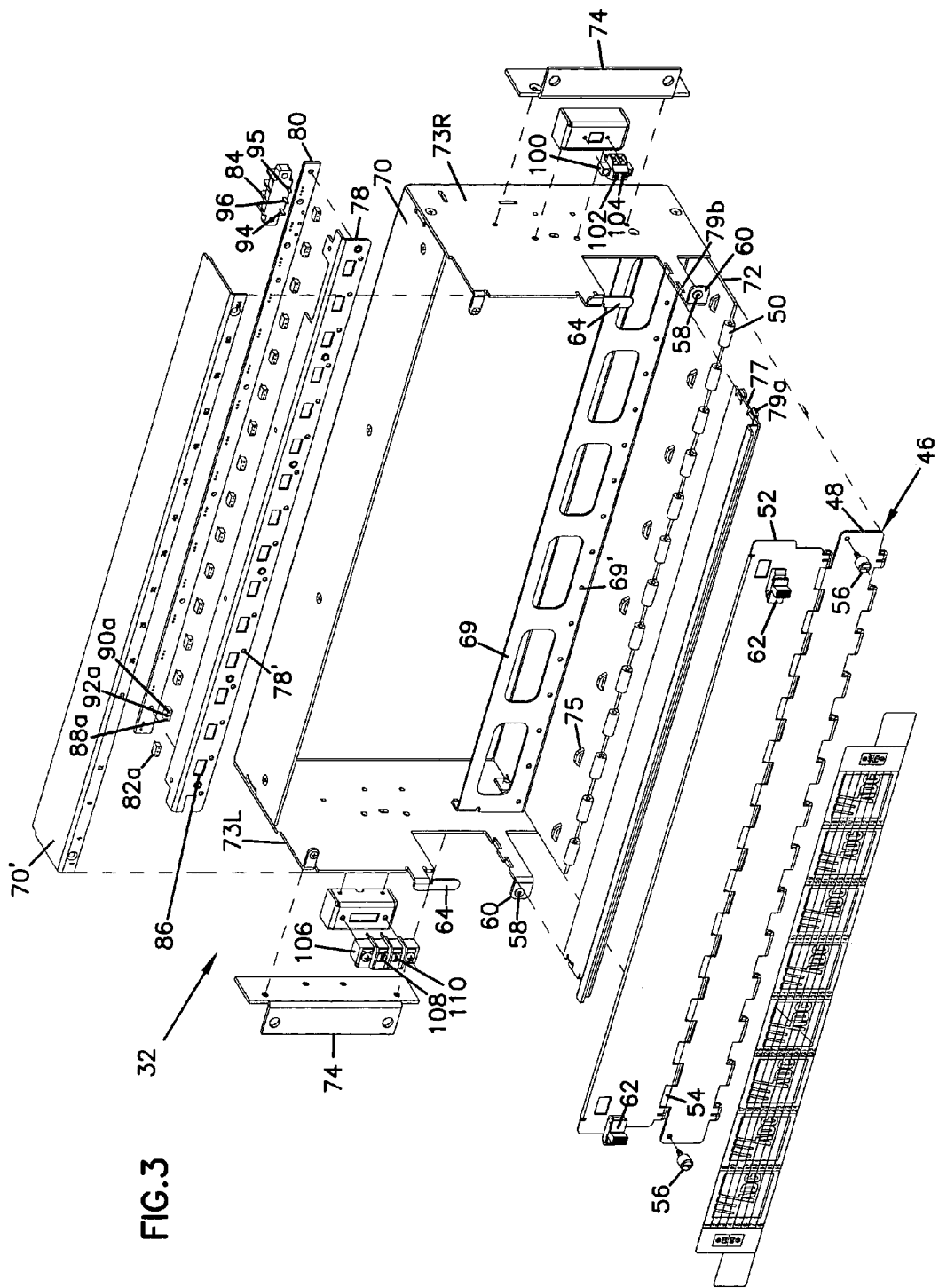
FIG. 3 is a front exploded view of the chassis of the DSX system of FIG. 2A.
Figure 4:
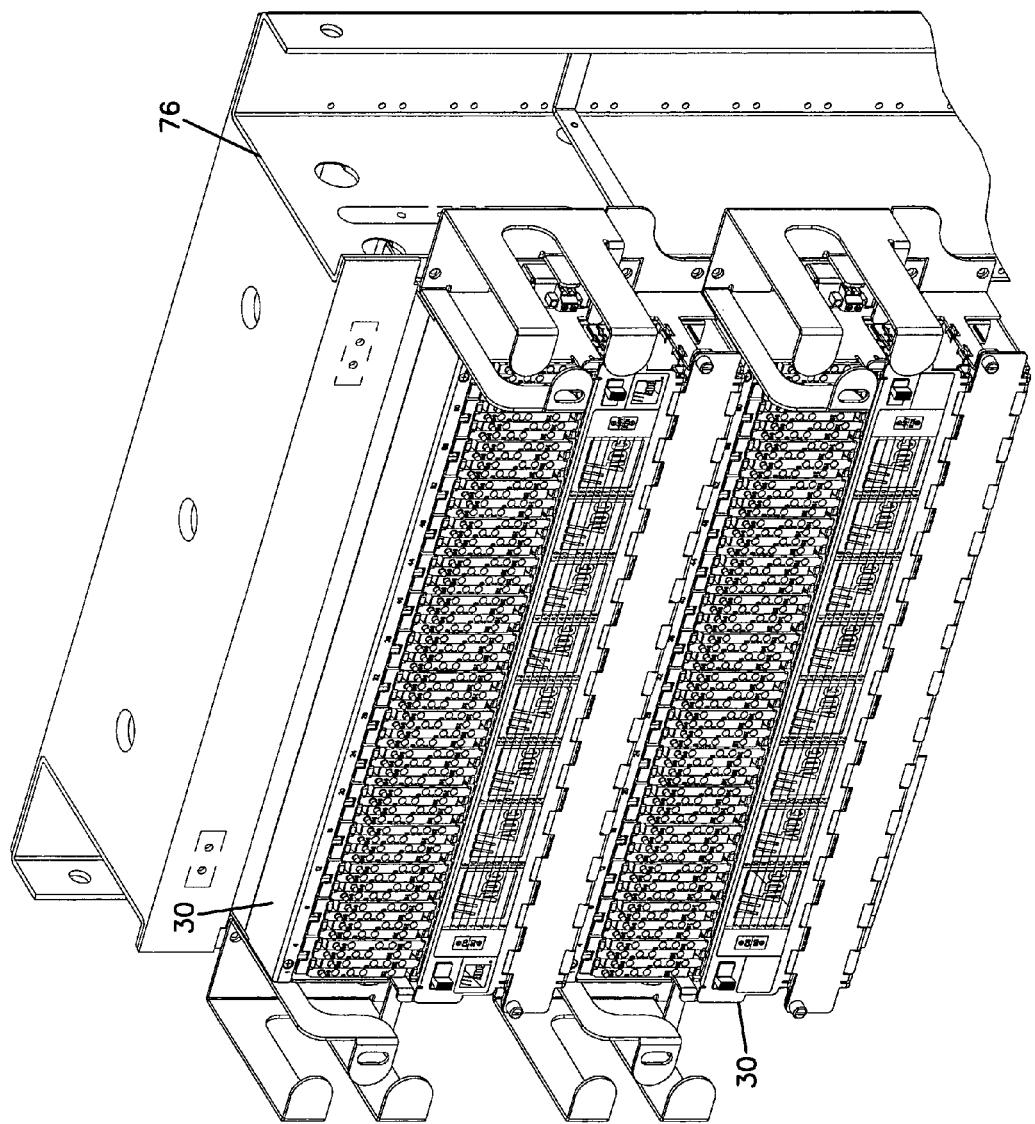
FIG. 4 shows two of the DSX systems of FIG. 2A mounted on a conventional telecommunications rack.

FIG. 3 is an exploded view of the chassis 32 of the DSX system 30. The chassis 32 includes top and bottom walls 70, 72 interconnected by left and right sidewalls 73L, 73R. Top and bottom walls 70, 72 and side walls 73L, 73R cooperate to define a chamber or housing for receiving the jack modules 34. The top wall 70 includes a top panel 70' that can be removed to facilitate access to the interior of the housing during insertion or removal of the jack modules 34. Mounting flanges 74 are mounted on the left and right side walls 73L, 73R. The mounting flanges 74 are used to connect the chassis 32 to a conventional telecommunications rack 76 as shown in FIG. 4.

It will be appreciated that the chassis 32 is preferably adapted for housing a plurality of jack modules. To conform with conventional international standards, the chassis 32 can have a length of about 19 inches. This embodiment can house, for example, 16 jack modules. Alternatively, in accordance with standard United States specifications, the chassis could be configured to have a length of about 23 inches. This embodiment can house, for example, 21 jack modules. Of course, other sizes of chassis and other numbers of jack modules could also be used.

As indicated previously, the chassis 32 includes front door 46 for covering the cross-connect blocks 40 and the IN/OUT blocks 42 of the jack modules 34. The front door 46 includes a lower panel 48 pivotally connected to the front edge of the bottom wall 72 of the chassis 32 by a lower hinge 50. The front door 46 also includes an upper panel 52 pivotally connected to an upper edge of the lower panel 48 by an upper hinge 54. The hinges 50 and 54 are shown in a horizontal orientation and are oriented parallel to one another. The lower panel 48 is preferably sized to cover the IN/OUT blocks 42 of the DSX system 30, and the upper panel 52 is preferably sized to cover the cross-connect blocks 40 of the DSX system 30. FIG. 2A shows the front cover panel 46 completely open such that both the cross-connect blocks 40 and the IN/OUT blocks 42 are accessible. FIG. 2B shows the front door 46 with only the lower panel 48 closed. The lower panel 48 is held in the closed position by thumbscrews 56 (shown in FIG. 2B) threaded within internally threaded openings 58 defined by front tabs 60 (shown in FIG. 2A) of the chassis 32. In the position of FIG. 2B, the cross-connect blocks 40 can be accessed while the IN/OUT blocks 42 remain protected by the lower panel 48. FIG. 2C shows the front door 46 with both the lower panel 48 and the upper panel 52 in closed positions. The upper panel 52 is held in the closed position by retractable latches 62 (shown in FIGS. 2A and 2B) that slide behind front retaining members 64 (shown in FIG. 2A) of the chassis 32 when the upper panel 52 is closed. A circuit designation label can be provided on the door 46 (e.g., on the front face of the tipper panel 52 as shown in FIG. 2C).

The chassis 32 also includes cable management structure corresponding to the cross-connect blocks 40 and the IN/OUT blocks 42. For example, the bottom wall 72 of the chassis 32 includes cable tie down loops 75 (shown in FIG. 3) for tying down cables routed to and from the IN/OUT blocks 42. Also, the chassis includes a drop-in, removable divider 77 (shown in FIG. 3) for supporting cables routed to and from the cross-connect panels 40, and for keeping the cross-connect cables separate from the IN/OUT cables. When mounted in the chassis 32, the divider 77 projects forwardly from the blocks 40, 42 and is positioned between the blocks 40, 42. To hold the divider 77 in place, tabs 79a of the divider 77 fit within notches 79b of the chassis 32. The divider 77 functions as a cable support tray for holding cables laterally routed to and from the cross-connect blocks 40.

Referring again to FIG. 3, the chassis 32 includes a power strip cover plate 78 and power strip 80 that are mounted adjacent the top of the chassis 32. The power strip 80 includes a plurality of electrical receptacles 82a electrically connected to a main power connector 84. The electrical receptacles 82a align with and are set behind openings 86 defined by the power strip cover plate 78. Each of the electrical receptacles 82a preferably defines a sleeve ground socket 88a, a power socket 90a, and a power return socket 92a. The main power connector 84 includes conductive pins 94–96. Pin 94 is electrically connected in series with the sleeve ground sockets 88a, pin 95 is electrically connected in series with the power sockets 90a, and pin 96 is electrically connected in series with the power return sockets 92a. Pins 95 and 96 are electrically connected to a front power panel 100 mounted on the flange 74 located at right side wall 73R. The front power panel 100 includes a power (i.e., battery or voltage) contact 102 wired to pin 95 and a battery/power return contact 104 wired to pin 96. The chassis 32 also includes a sleeve ground panel 106 mounted on the flange 74 located at the left side wall 73L. The sleeve ground panel 106 includes a sleeve ground contact 108 (i.e., a shield ground) that is preferably wired to pin 94 of the main power connector 84. The sleeve ground panel 106 also can include a chassis ground contact 110. In some embodiments, a jumper strap (not shown) can electrically connect the sleeve ground contact 108 to the chassis ground contact 110.

The front power panel 100 and the front sleeve ground panel 106 allow all grounding and power source wiring of the DSX system 30 to be accomplished from the front of the chassis 32. Further, because all of the components of the chassis 32 (e.g., the jacks 36, 38; the cross-connect blocks 40; the IN/OUT blocks 42; the power panel 100; and the sleeve ground panel 106) are accessible from the front of the chassis 32, two of the chassis 32 can be mounted back-to-back in a rack to increase the capacity of the rack.

Figure 5D:
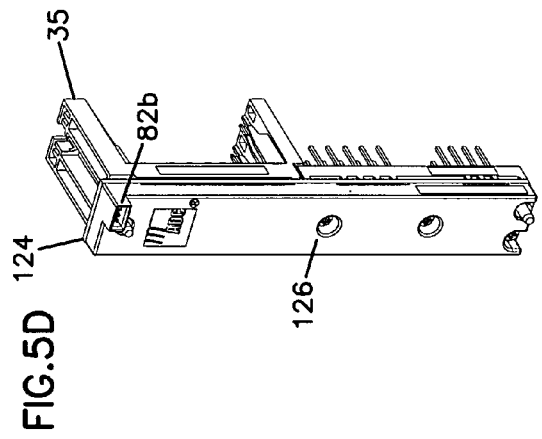
FIG. 5D is a rear view of the DSX jack module of FIG. 5C.
Figure 5C:
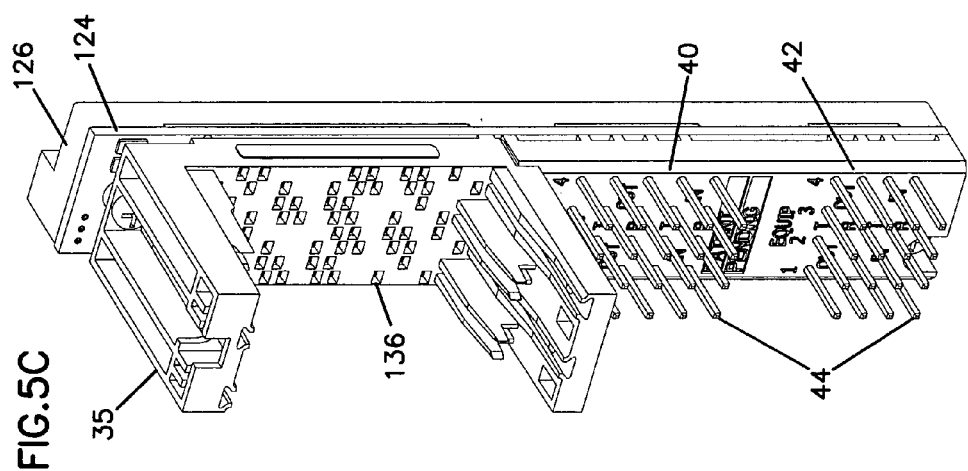
FIG. 5C illustrates the DSX jack module of FIG. 5A with the DSX jacks removed.

To mount jack modules 34 within the chassis 32, the front door 46 is opened as shown in FIG. 2A and the jack modules 34 are inserted through the open front end of the chassis 32. The jack modules 34 are inserted rearwardly into the chassis 32 until the jack modules engage a mounting flange 69 (shown in FIG. 3) that projects upwardly from the bottom wall 72 of the chassis 32. Fasteners 127 (shown in FIG. 5B) are then inserted through the jack mounts 34 and also through openings 69' defined by the mounting flange 69 to secure lower portions of the jack modules 34 to the chassis 32. To secure upper portions of the jack mounts 34 to the chassis 32, fasteners 127 are inserted through the jack modules 34 and through openings 78' defined by the power strip cover plate 78. After the jack modules 34 have been secured in the chassis 32, the front door 46 is moved to the closed position of FIG. 2C. During the mounting process, the top panel 70' can be removed to facilitate access to the interior of the chassis 32.

To remove the jack mounts 34 from the chassis 32, the door 46 is opened as shown in FIG. 2A and the fasteners 127 are removed. After removal of the fasteners 127, the jack mounts 34 can be manually pulled from the front of the chassis 32.

II. DSX Jack Module of First Embodiment

FIG. 5A shows one of the jack modules 34 in isolation from the remainder of the DSX system 30. The jack module 34 includes the jack mount 35 for holding the jacks 36, 38. The jack module 34 also includes one cross-connect block 40 and one IN/OUT block 42. The cross-connect block 40 and the In/OUT block 42 are preferably formed on a single integral piece of dielectric material (e.g., plastic) that is removably connected to a lower edge of the jack mount 35 (e.g., by a tongue and grove configuration as disclosed in U.S. Pat. No. 6,116,961 that is hereby incorporated by reference). The jack module 34 further includes a printed circuit board 124 for providing electrical connections between the jacks 36, 38 and the wire wrap pins 44 of the cross-connect and IN/OUT blocks 40, 42. A dielectric back piece 126 covers a back side of the printed circuit board 124.

a. Jack Mount

The jack mount 35 of each jack module 34 is preferably configured to removably receive the odd and even DSX jacks 36 and 38. For example, the jacks 36 and 38 can be retained within the jack mount 35 by resilient latches 37 as described in U.S. Pat. No. 6,116,961. By flexing the latches 37, the jacks 36 and 38 can be manually removed from the jack mount 35. When the jacks 36 and 38 are removed from the jack mount 35, the jacks 36 and 38 are electrically disconnected from the circuit board 124. While the jack module 34 is shown as a "four-pack" (i.e., a module including four jacks), it will be appreciated that alternative modules can include jack mounts sized to receive more or fewer than four jacks.

The jack mount 35 of each jack module 34 includes a plurality of sockets 136 (shown in FIG. 5B) for providing electrical interfaces with the jacks 36, 38 when the jacks 36, 38 are mounted in the jack mounts 35. The sockets 136 include contact pins 138 electrically connected directly to the printed circuit board 124.

b. DSX Jacks

Referring to FIG. 5A, each of the jacks 36, 38 includes a front face defining an OUT Port 128, a MONITOR-OUT Port 129, an IN Port 130 and a MONITOR-IN Port 131. The ports 128–131 are sized to receive tip-and-ring plugs. The jacks 36, 38 also define LED ports 132 for receiving tracer lamps. The jacks 36, 38 include electrical contacts 133 corresponding to each of the ports 128–132. The contacts 133 include tails 134 that project rearwardly from each of the jacks 36, 38. When the jacks 36, 38 are inserted within the jack mount 35, the tails 134 of the contacts 133 slide within sockets 136 of the jack mount 34 (best shown in FIG. 5B) to provide electrical connections between the circuit board 124 and the jacks 36, 38. When the jacks 36, 38 are removed from the jack mount 120, the jacks 36, 38 are electrically disconnected from the circuit board 124.

Referring to FIGS. 6A and 6B, the electrical contacts of the jacks 36, 38 include voltage contacts −48V, tracer lamp contacts TL and return contacts RET corresponding to the LED circuits. The electrical contacts also include tip springs T and ring springs R corresponding to the MONITOR-IN and MONITOR-OUT ports. The electrical contacts further include tip-in contacts TI, ring-in contacts RI, cross-connect tip-in contacts XTI and cross-connect ring-in contacts XRI corresponding to the IN ports. The electrical contacts further include tip-out contacts TO, ring-out contacts RO, cross-connect tip-out contacts XTO and cross-connect ring-out contacts XRO corresponding to the OUT ports. The contacts operate in the same manner described in U.S. Pat. No. 6,116,961 that was previously incorporated by reference. The contacts TI, RI, XTI and XRI and the contacts TO, RO, XTO and XRO cooperate to define normally "through" or normally "closed" switches.

c. Circuit Board and Back Piece

As shown in FIG. 5B, the circuit board 124 is positioned directly behind the jack mount 35, the cross-connect block 40 and the IN/OUT block 42. The circuit board 124 includes a first portion 124a adjacent to and co-extensive with the back side of the jack mount 35. The first portion 124a includes a plurality of plated through-holes 139 that receive the contact pins 138 of the sockets 136 to provide a direct electrical connection between the circuit board 124 and the pins 138.

The circuit board 124 also includes a second portion 124b adjacent to and co-extensive with the back side of the cross-connect block 40. The second portion 124b includes a plurality of plated through-holes 146 that receive back ends of the wire wrap pins 44 mounted at the cross-connect block 40. This provides a direct electrical connection between the circuit board 124 and the pins 44 of the cross-connect block.

The circuit board 124 further includes a third portion 124c adjacent to and co-extensive with the back side of the IN/OUT block 42. The third portion 124c includes a plurality of plated through-holes 148 that receive the wire wrap pins 44 of the IN/OUT block 42 to provide a direct electrical connection between the circuit board 124 and the pins 44.

The back piece 126 of each jack module 34 is preferably made of a dielectric material and is sized to cover the back side of the circuit board 124. The back piece 126 defines a plug 82b that electrically connects with a corresponding one of the receptacles 82a of the chassis 32 when the jack mounts 34 are mounted in the chassis 32. The plugs 82b include sleeve ground pins 88b, power/voltage pins 90b and power return pins 92b that are respectively received in the sleeve ground sockets 88a, the power sockets 90a, and the power return sockets 92a of the receptacles 82a when the plugs 82b and the receptacles 82a are coupled. The pins 88b, 90b and 92b are connected directly to the circuit board 124 (e.g., the pins extend within plated through-holes 93 defined by the circuit board 124).

Referring to FIGS. 6A and 6B, the circuit board 124 includes tracings 290 that electrically connect the wire wrap pins 44 of the IN/OUT block 42 to sockets corresponding to the contacts TI, RI, TO and RO of the jacks 36, 38. The circuit board 124 also includes tracings 292 that provide electrical connections between the wire wrap pins 44 of the cross-connect block 40 and sockets corresponding to contacts XTI, RTI, XTO and XRO of the jacks 36, 38. Additionally, the circuit board 124 includes tracings 294 for electrically tracings 290 to the sockets corresponding to the contacts of the MONITOR ports of the jacks 36, 38. Further, the circuit board 124 includes tracings 296 for connecting the sleeve ground pins 88b to sockets corresponding to the sleeve ground contacts SG of the jacks 36, 38; tracings 298 for connecting tracer lamp pins of the cross-connect panels 40 to sockets corresponding to the tracer lamp contacts TL of the jacks 36, 38; tracings 100 for connecting power pins 90b to sockets corresponding to the voltage contacts –48V of the jacks 36, 38; and tracings 102 for connecting power return pins 92b to sockets corresponding to the return contacts RET of the jacks 36, 38.

d. Cross-Connect Block and IN/OUT Block

Referring to FIG. 5B, the cross-connect block 40 and the IN/OUT block 42 of each jack module 34 can include a one-piece support structure 147 preferably made of a dielectric material such as plastic. The support structure defines a first field or array of openings 143 for receiving the wire wrap pins 44 of the cross-connect block 40. The support structure also defines a second field or array of openings 145 for receiving the wire wrap pins 44 of the IN/OUT block 42. The pins 44 are preferably press fit or staked through the openings 143, 145 and preferably have rear ends that project rearwardly from the support structure. The rear ends of the pins 42 preferably terminate at the circuit board 124 to provide an electrical connection therewith.

e. Assembly of Jack Mount

The jack module 34 is assembled by press fitting contact pins 138 into the sockets 136 of the jack mount 35, staking the wire termination pins 44 of the cross-connect block 40 through openings 143 of the support structure 147 and staking the wire termination pins 44 of the OUT/IN block 42 through the openings 145 of the support structure 147. After the pins 138 and 44 have been press fit or staked within their respective components, the support structure 147 is connected to a bottom edge of the jack mount 35 (e.g., by a snap-fit connection). In other embodiments, the jack mount 35 and the support structure 147 can be formed as a single integral piece. Once the support structure 147 and the jack mount 35 have been connected, the resultant piece is mechanically and electrically connected to the circuit board 124 by inserting rear ends of pins 138, 44 within their corresponding plated through holes 139, 146 and 148 defined by the circuit board 124. The rear ends of the pins 138, 44 can be soldered in the board 124 to further secure the connections. Pins 88b, 90b and 92b are also inserted within their corresponding plated-through holes 93 defined by the circuit board 124. The back cover piece 126 is then placed over the back side of the circuit board 124 and fasteners 127 (shown in FIG. 5B) are used to secure the assembly together.

As described above, the fasteners 127 also function to secure the jack modules 34 within the chassis 32.

III. Use of DSX System

It will be appreciated that the DSX system 30 operates in the same manner as a conventional DSX system. The IN/OUT blocks 42 allow the jacks 36, 38 to be connected to pieces of digital equipment. The cross-connect blocks 40 allow the jacks 36, 38 to be cross-connected by semi-permanent jumpers. The jacks 36, 38 provide normally-through connections between the digital equipment connected to the IN/OUT blocks 42 and the cross-connect blocks 40. By inserting patch plugs in the MONITOR ports of the jacks 36, 38, signals passing through the jacks 36, 38 can be monitored without interrupting the signals. The tracer lamp circuits allow the cross-connected jacks being monitored to be traced as is described in U.S. Pat. No. 6,116,961. Plugs can be inserted in the IN or OUT ports of the jacks 36, 38 for testing or diagnostic purposes, or for re-routing signals to different pieces of digital equipment.

IV. Alternative Embodiment

Figure 7A:
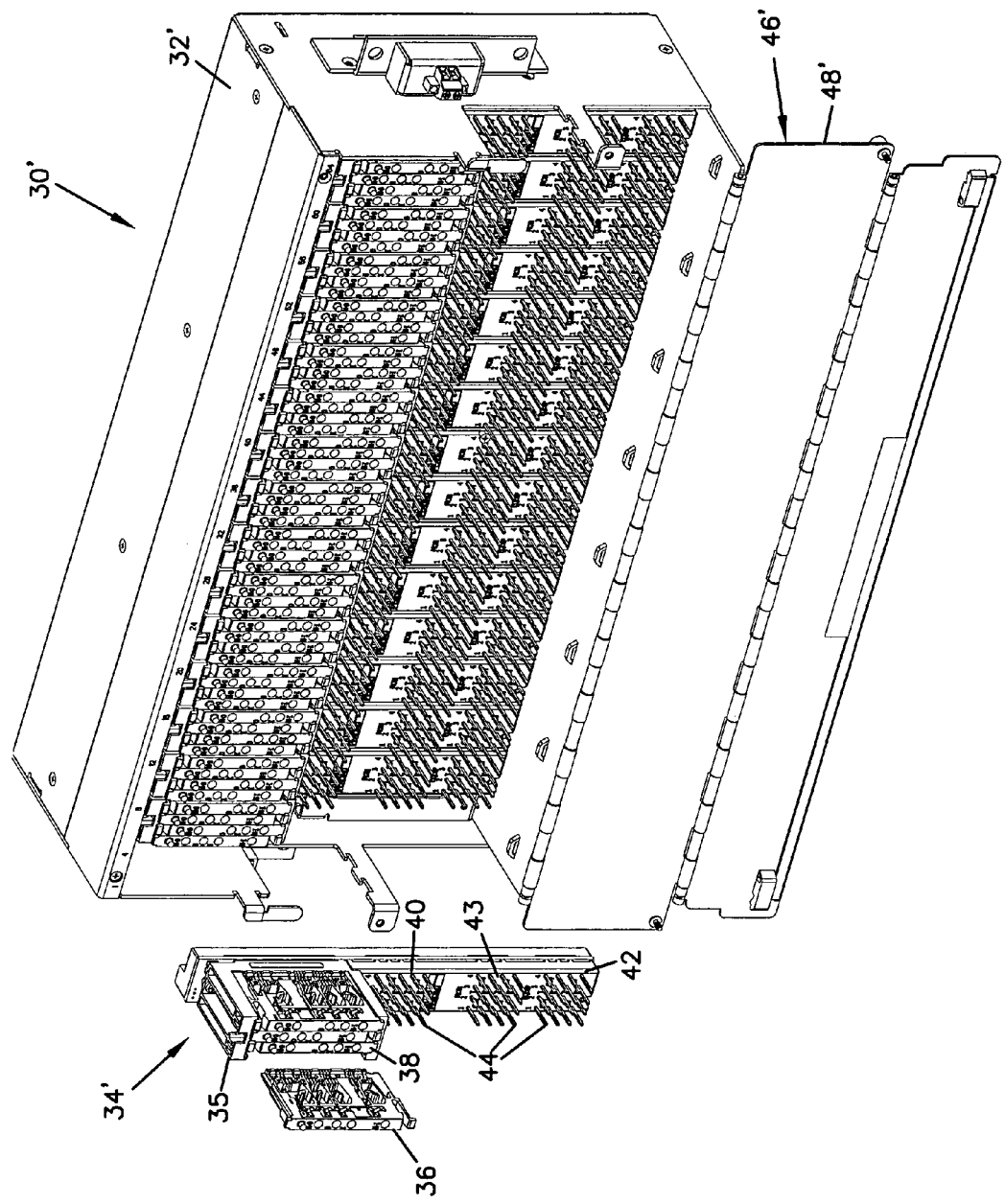
FIG. 7A is front perspective view of a DSX system that is another embodiment of the present invention, a bi-fold front door of the system is shown in an open position.
Figure 7B:
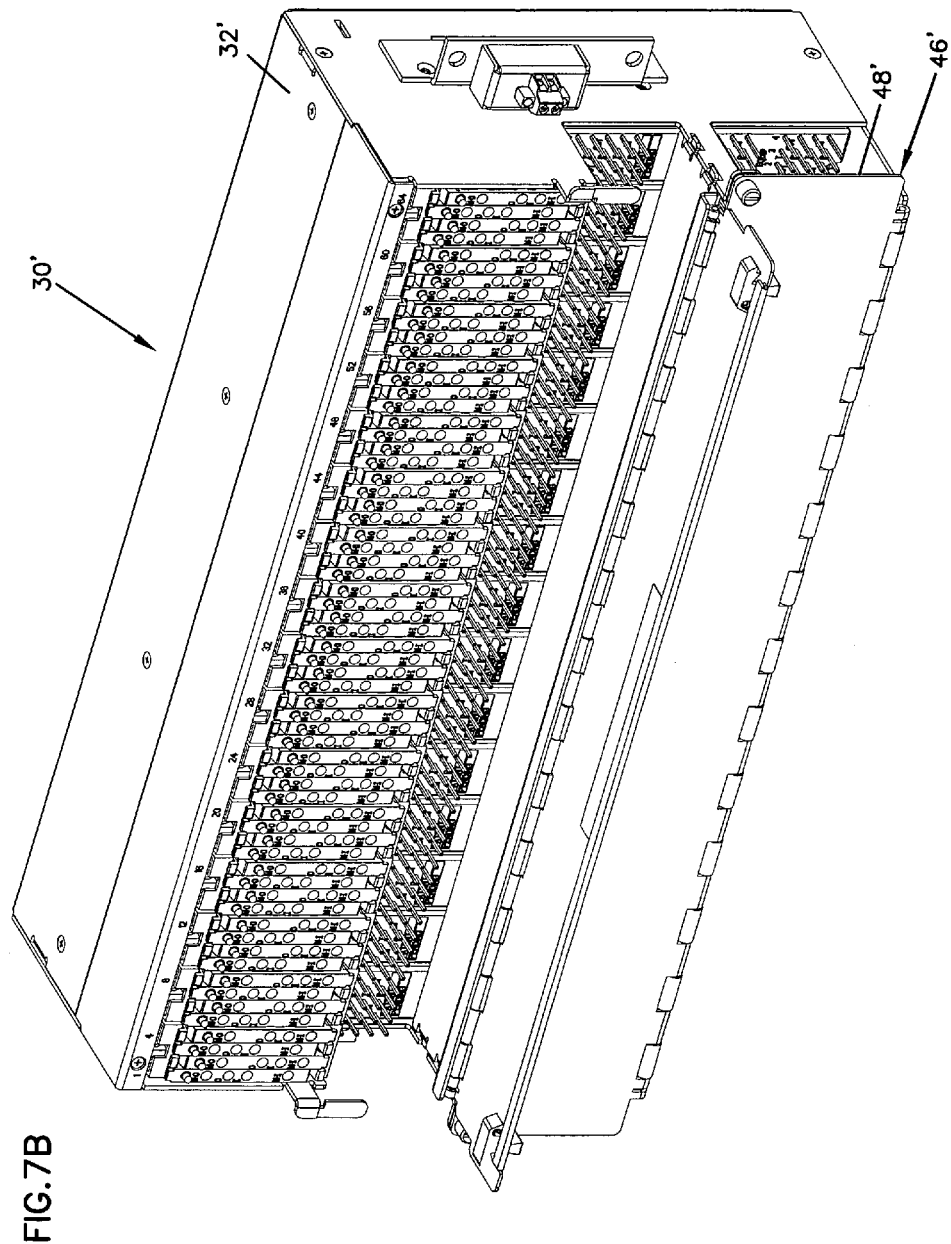
FIG. 7B shows the DSX system of FIG. 7A with one panel of the bi-fold door in a closed position.
Figure 7C:
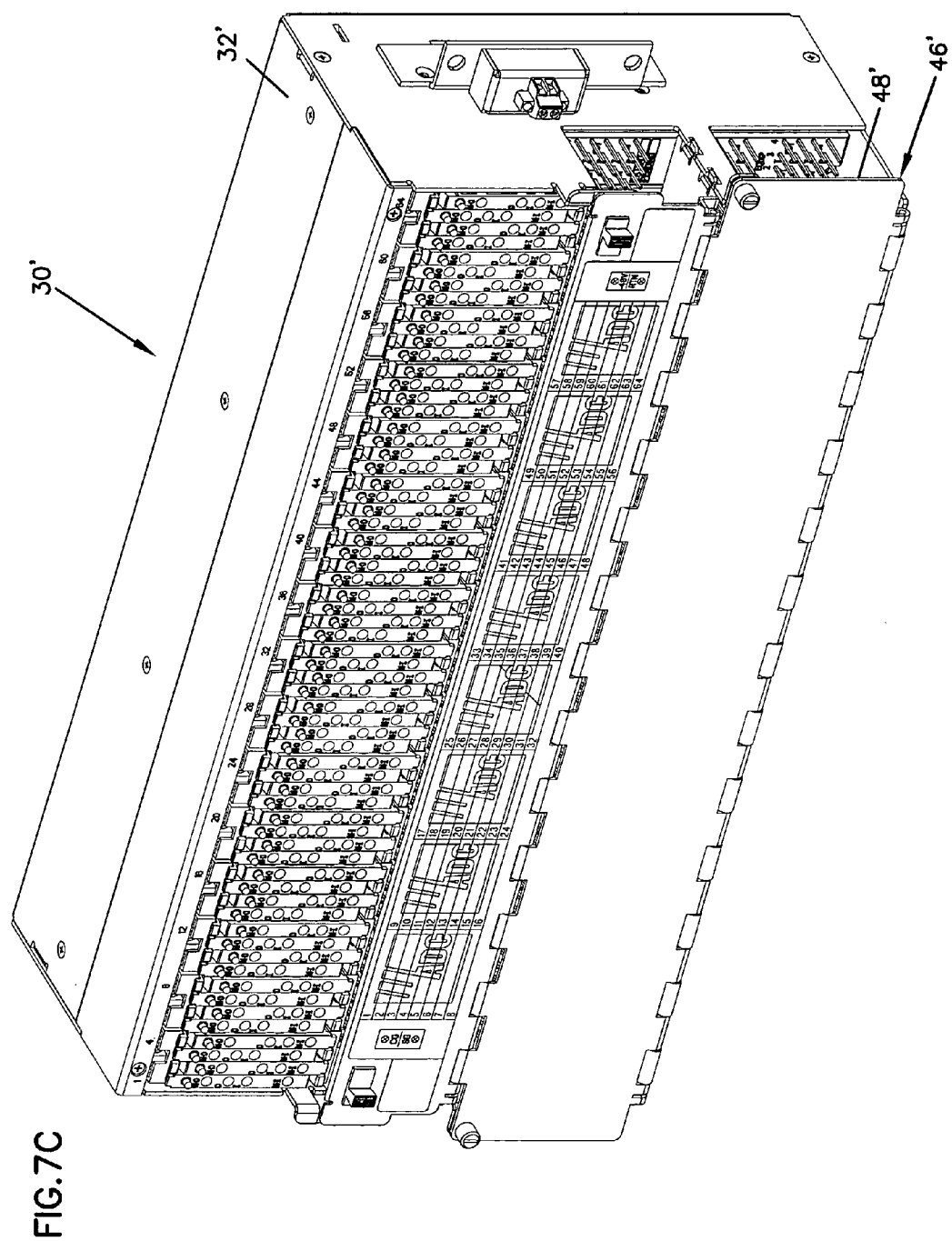
FIG. 7C shows the DSX system of FIG. 7A with both panels of the bi-fold panel in closed positions.
Figure 9D:
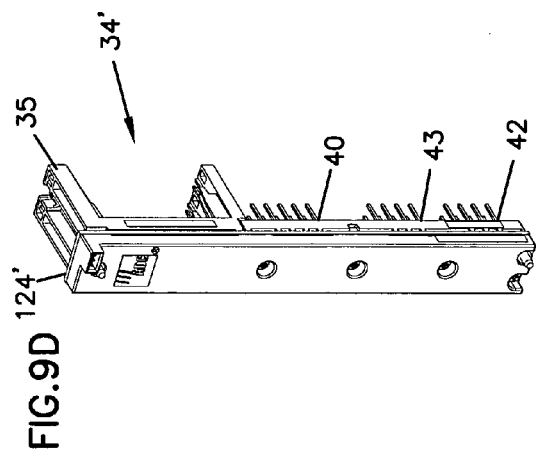
FIG. 9D is a rear perspective view of the DSX jack module of FIG. 9C.
Figure 9C:
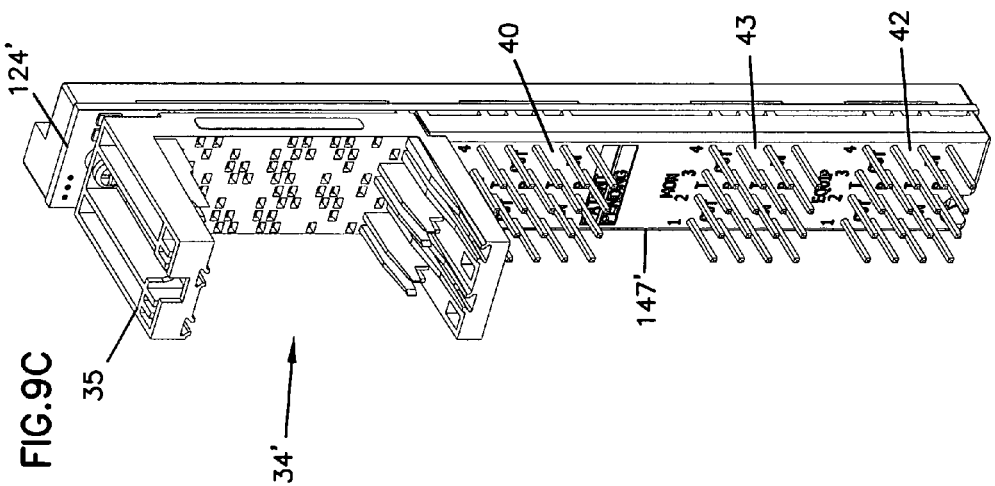
FIG. 9C shows the DSX jack module of FIG. 9A with the DSX jacks removed.

FIGS. 7A–7C show a DSX system 30' that is another embodiment of the present invention. Many of the components of the DSX system 30' are identical to components of the DSX system 30. These identical components have been assigned identical reference numbers.

The DSX system 30' The DSX system 30 includes a chassis 32' for holding a plurality (e.g., 16) of removable jack modules 34'. Each of the jack modules 34' includes a jack mount 35 configured to hold a plurality of jacks (e.g., two odd jacks 36 and two even jacks 38). The jack modules 34' also each include a forwardly facing cross-connect array 40 and a forwardly facing IN/OUT array 42 and a forwardly facing MONITOR array 43. The arrays 40, 42 and 43 include a plurality of termination structures such as wire wrap pins 44 or other types of connectors/contacts for terminating a wire (e.g., insulation displacement connectors or other connectors). The chassis 32' of the DSX system 30' includes a front door 46' for covering the cross-connect array 40, the IN/OUT array 42 and the MONITOR array 43. The door 46' is the same as the door 46 of FIGS. 2A–2C except lower panel 48' has been enlarged as compared to panel 48 so as to be sized to cover both the IN/OUT array 42 and the MONITOR array 43. As is apparent from FIG. 8, except for the height, the remainder of the chassis 32' is the same as the chassis 32 of FIG. 3.

Referring to FIGS. 9A–9D, the jack module 34' has the same configuration as the jack module 34 of FIGS. 5A–5D except for the addition of the MONITOR array 43. The arrays 40, 42 and 43 are all provided on a one-piece support structure 147' that removably connects to the jack mount 35. The wire wrap pins 44 of the arrays 40, 42 and 43 are staked through the support structure 147' and have rear ends electrically and mechanically terminated at circuit board 124'. Circuit board 124 is elongated as compared to circuit board 124 so as to complement the increased length of the support structure 147' caused by the addition of the MONITOR array 43. As shown in FIGS. 10A and 10B, the circuit board 124' includes tracings 300 for connecting the wire wrap pins 44 of the MONITOR array 43 to the tracings 290. The MONITOR array 43 allows IN and OUT signals passing through the jack module 34' to be permanently monitored. As previously described, the IN and OUT signals can also be monitored by inserting plugs in the MONITOR-IN or MONITOR-OUT ports of the jacks 36, 38.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A telecommunications device comprising:
   a chassis including first and second portions; and
   a door covering the first and second portions of the chassis, the door including a first panel adapted to cover the first portion of the chassis when in a closed position and a second panel adapted to cover the second portion of the chassis when in a closed position, the first panel being pivotally connected to the chassis by a first hinge allowing the first panel to pivot about a first pivot axis and the second panel being pivotally connected to the first panel by a second hinge allowing the second panel to pivot about a second pivot axis, the first pivot axis and the second pivot axis being parallel to one another, wherein, when the first and second panels are both in a closed position, major front surfaces of the first and second panels extend generally in the same plane.

2. The telecommunications device of claim 1, further comprising a first termination field located at the first portion of the chassis and a second termination field located at the second portion of the chassis.

3. The telecommunications device of claim 2, wherein the first termination field includes IN/OUT termination structures and the second termination field includes cross-connect terminations structures wherein the door is configured such that the cross-connect termination structures are accessible by opening the second panel of the door while the IN/OUT termination structures remain covered by the first panel of the door.

4. The telecommunications device of claim 2, further comprising a removable cable management tray mounted between the first and second termination fields, the cable management tray aligned generally with the second hinge.

5. The telecommunications device of claim 1, wherein the chassis has a length of about 19 inches.

6. The telecommunications device of claim 1, wherein the chassis has a length of about 23 inches.

7. The telecommunications device of claim 1, further comprising a circuit designation label provided on the door.

8. The telecommunications device of claim 1, wherein the door includes retractable latches that slide behind retaining members located on the chassis keeping at least one of the panels closed relative to the chassis.

9. The telecommunications device of claim 2, wherein the chassis includes a cable management structure provided in front of the first and second termination fields, the cable management structure aligned generally with the first hinge.

10. The telecommunications device of claim 1, wherein the chassis includes first and second sidewalls extending between a front and a back of the chassis, the chassis including rack-mounting structures adjacent the first and second sidewalls.

11. The telecommunications device of claim 1, wherein the chassis includes top and bottom walls interconnected by first and second sidewalls, the top and bottom walls and the sidewalls cooperating to define a chamber, the chassis including rack-mounting structures adjacent the first and second sidewalls, the first panel being pivotally connected to a front edge of the bottom wall of the chassis by the first hinge and the second panel being pivotally connected to an upper edge of the first panel by the second hinge.

12. The telecommunications device of claim 11, wherein the first and second sidewalls of the chassis extend between a front and a back of the chassis, the first sidewall including a power panel and the second sidewall including a sleeve ground panel mounted thereon, the power panel and the sleeve ground panel allowing all grounding and power source wiring of the chassis to be accomplished from the front of the chassis.

13. The telecommunications device of claim 3, wherein the second panel is taller than the first panel.

14. The telecommunications device of claim 3, wherein the first panel is adapted to cover the IN/OUT termination structures and also MONITOR termination structures located in the first portion of the chassis.

15. A telecommunications device comprising:
   a chassis including a front side and a back side;
   a plurality of jacks mounted in the chassis, the jacks including ports adapted for receiving plugs, the jacks including switches for contacting the plugs when the plugs are inserted within the ports, the ports being located at the front side of the chassis;
   cross-connect termination structures located at the front side of the chassis;
   IN/OUT termination structures located at the front side of the chassis;
   a circuit board including a first portion located behind the jacks, a second portion located behind the cross-connect termination structures and a third portion located behind the IN/OUT termination structures; and
   a door for covering the cross-connect termination structures and the IN/OUT termination structures located in front of the chassis, the door including a first panel pivotally connected to the chassis by a first hinge, the first panel adapted to cover the IN/OUT termination structures, the door also including a second panel pivotally connected to the first panel by a second hinge, the second panel adapted to cover the cross-connect termination structures.

16. The telecommunications device of claim 15, further comprising a removable cable management tray mounted between the cross-connect termination structures and the IN/OUT termination structures, the cable management tray aligned generally with the second hinge for keeping cross-connect cables separate from IN/OUT cables.

17. The telecommunications device of claim 15, wherein the cross-connect termination structures are accessible by opening the second panel of the door while the IN/OUT termination structures remain covered by the first panel of the door.

18. A telecommunications device comprising:
   a chassis including first and second portions, a first termination field being located at the first portion of the chassis and a second termination field being located at the second portion of the chassis, the first termination field including IN/OUT termination structures and also MONITOR termination structures and the second termination field including cross-connect terminations structures; and
   a door covering the first and second portions of the chassis, the door including a first panel adapted to cover the first portion of the chassis and a second panel adapted to cover the second portion of the chassis, the first panel being pivotally connected to the chassis by a first hinge allowing the first panel to pivot about a first pivot axis and the second panel being pivotally connected to the first panel by a second hinge allowing the second panel to pivot about a second pivot axis, the first pivot axis and the second pivot axis being parallel to one another, wherein the door is configured such that the cross-connect termination structures are accessible by opening the second panel of the door while the IN/OUT termination structures and the MONITOR termination structures remain covered by the first panel of the door.

19. The telecommunications device of claim 18, wherein the first panel is taller than the second panel.

20. A telecommunications device comprising:
a chassis including first and second portions;
a first termination field located at the first portion of the chassis and a second termination field located at the second portion of the chassis, the first termination field including IN/OUT termination structures and the second termination field including cross-connect terminations structures; and
a door covering the first and second portions of the chassis, the door including a first panel adapted to cover the first portion of the chassis when in a closed position and a second panel adapted to cover the second portion of the chassis when in a closed position, the first panel being pivotally connected to the chassis by a first hinge and the second panel being pivotally connected to the first panel by a second hinge, the first and second hinges being oriented parallel to one another, the door being configured such that the cross-connect termination structures are accessible by opening the second panel of the door while the IN/OUT termination structures remain covered by the first panel of the door, wherein, when the first and second panels are both in a closed position, major front surfaces of the firstand second panels extend generally in the same plane.

21. The telecommunications device of claim 20, wherein the second panel is taller than the first panel.

22. The telecommunications device of claim 20, wherein the first panel is adapted to cover the IN/OUT termination structures and also MONITOR termination structures located in the first portion of the chassis.

23. A telecommunications device comprising:
a chassis including first and second portions; and
a door covering the first and second portions of the chassis, the door including a first panel adapted to cover the first portion of the chassis and a second panel adapted to cover the second portion of the chassis, the first panel being pivotally connected to the chassis by a first hinge allowing the first panel to pivot about a first pivot axis and the second panel being pivotally connected to the first panel by a second hinge allowing the second panel to pivot about a second pivot axis, the first pivot axis and the second pivot axis being parallel to one another, wherein the chassis includes top and bottom walls interconnected by first and second sidewalls, the top and bottom walls and the sidewalls cooperating to define a chamber, the chassis including rack-mounting structures adjacent the first and second sidewalls, the first panel being pivotally connected to a front edge of the bottom wall of the chassis by the first hinge and the second panel being pivotally connected to an upper edge of the first panel by the second hinge.

24. The telecommunications device of claim 23, wherein the first and second sidewalls of the chassis extend between a front and a back of the chassis, the first sidewall including a power panel and the second sidewall including a sleeve ground panel mounted thereon, the power panel and the sleeve ground panel allowing all grounding and power source wiring of the chassis to be accomplished from the front of the chassis.

25. A telecommunications device comprising:
a chassis including first and second portions; and
a door covering the first and second portions of the chassis, the door including a first panel adapted to cover the first portion of the chassis and a second panel adapted to cover the second portion of the chassis, the first panel being pivotally connected to the chassis by a first hinge allowing the first panel to pivot about a first pivot axis and the second panel being pivotally connected to the first panel by a second hinge allowing the second panel to pivot about a second pivot axis, the first pivot axis and the second pivot axis being parallel to one another, wherein the door includes retractable latches that slide behind retaining members located on the chassis keeping at least one of the panels closed relative to the chassis.

* * * * *

UNITED STATES PATENT AND TRADEMARK OFFICE
CERTIFICATE OF CORRECTION

PATENT NO. : 7,195,521 B2 Page 1 of 1
APPLICATION NO. : 11/033991
DATED : March 27, 2007
INVENTOR(S) : Musolf et al.

It is certified that error appears in the above-identified patent and that said Letters Patent is hereby corrected as shown below:

Col. 4, line 25: "of the tipper panel" should read --of the upper panel--

Col. 8, line 26: "The DSX system 30' The DSX system 30 includes" should read --The DSX system 30' includes--

Col. 10, line 14, claim 15: "plurality ofjacks mounted" should read --plurality of jacks mounted--

Col. 11, line 29, claim 20: "of the firstand" should read --of the first and--

Signed and Sealed this

Twenty-seventh Day of January, 2009

JOHN DOLL
*Acting Director of the United States Patent and Trademark Office*